(12) United States Patent
Shimbo

(10) Patent No.: US 6,254,024 B1
(45) Date of Patent: Jul. 3, 2001

(54) ROTATIONAL LOAD APPLYING MECHANISM FOR A TAPE RECORDER

(75) Inventor: Takaichi Shimbo, Tokyo (JP)

(73) Assignee: MEC Co., Ltd., Tokyo (JP)

( * ) Notice: Subject to any disclaimer, the term of this patent is extended or adjusted under 35 U.S.C. 154(b) by 0 days.

(21) Appl. No.: 09/256,184

(22) Filed: Feb. 24, 1999

(51) Int. Cl.$^7$ ...................................................... G03B 1/04
(52) U.S. Cl. ........................ 242/349; 242/356; 242/356.7
(58) Field of Search ................................ 242/349, 356.7, 242/356, 356.3, 356.2; 360/96.3, 96.4

(56) References Cited

U.S. PATENT DOCUMENTS

| | | | |
|---|---|---|---|
| 3,610,553 | * 10/1971 | Matsuyama | 242/354.1 |
| 3,785,586 | * 1/1974 | Engert et al. | 242/356.7 |
| 4,422,114 | * 12/1983 | Sugihara | 360/96.4 |
| 4,547,823 | * 10/1985 | Ri et al. | 360/90 |
| 4,935,831 | 6/1990 | Shimbo . | |
| 4,956,731 | * 9/1990 | Yoshimura | 242/333 |
| 5,041,930 | * 8/1991 | Tsuchiya | 242/338.4 |
| 5,788,175 | * 8/1998 | Hwang | 242/356.5 |
| 6,089,488 | * 7/2000 | Shimbo et al. . | |

\* cited by examiner

Primary Examiner—Donald P. Walsh
Assistant Examiner—Minh-Chau Pham
(74) Attorney, Agent, or Firm—Greenblum & Bernstein, P.L.C.

(57) ABSTRACT

A rotational load applying mechanism for a tape recorder having a rotation transmission gear for rotating a reel base in engagement with a gear of the reel base, causing a rotary shaft of the rotation transmission gear to move with operational force acquired by a rotational load of the rotation transmission gear, comprises a rotary arm member made of plastic and rotatable together with the rotary shaft of the rotation transmission gear; and an elastic holder, formed on the arm member, for holding, with a pressure, an outer surface of a boss to be a bearing for the rotary shaft of the rotation transmission gear, thereby applying the rotational load to the rotation transmission gear.

2 Claims, 10 Drawing Sheets

ROTATIONAL LOAD APPLYING MECHANISM FOR A TAPE RECORDER

BACKGROUND OF THE INVENTION

1. Field of the Invention

The present invention relates to a rotational load applying mechanism for a tape recorder. This rotational load applying mechanism for a tape recorder is designed in such a way that the shaft of a rotation transmission gear and a rotary arm member which rotates together with that shaft are formed of plastic, and an elastic fork-shaped holder is provided at the distal end of the plastic arm member, so that as the holder holds the outer surface of the rotation transmission gear, a rotational load is applied to the rotation transmission gear. The arm member and the rotation transmission gear are both formed of plastic to suppress wear-out caused by rubbing friction between both members as much as possible.

2. Description of the Related Art

In an ordinary rotational load applying mechanism for a tape recorder, as shown in FIG. 10, a metal spring body 17 like a leaf spring or coil spring is assembled at the same time as a rotation transmission gear 10 of plastic is fitted over a rotary shaft 12 to apply a rotational load to the rotation transmission gear 10.

When the metal spring body 17 like a leaf spring or coil spring is fitted on the shaft support of the plastic rotation transmission gear 10 to acquire a rotational load, it is difficult to acquire a reliable rotational load with the leaf spring or the use of the spring coil inevitably enlarges the rotational load applying mechanism. The frictional load between the metal spring body 17 and the plastic rotation transmission gear 10 would cause plastic, not metal, to wear out, resulting in an undesirable variation in rotational load.

SUMMARY OF THE INVENTION

Accordingly, it is an object of the present invention to improve the structure of the conventional rotational load applying mechanism for a tape recorder by employing a plastic-metal friction avoidable structure in applying a rotational load to a rotation transmission gear.

To achieve the above object, according to this invention, a rotational load applying mechanism for a tape recorder having a rotation transmission gear for rotating a reel base in engagement with a gear of the reel base, causing a rotary shaft of the rotation transmission gear to move with operational force acquired by a rotational load of the rotation transmission gear, comprises a rotary arm member made of plastic and rotatable together with the rotary shaft of the rotation transmission gear, and an elastic holder, formed on the arm member, for holding, with a pressure, an outer surface of a boss to be a bearing for the rotary shaft of the rotation transmission gear, thereby applying the rotational load to the rotation transmission gear.

DETAILED DESCRIPTION OF THE PREFERRED EMBODIMENT

Figure 1:
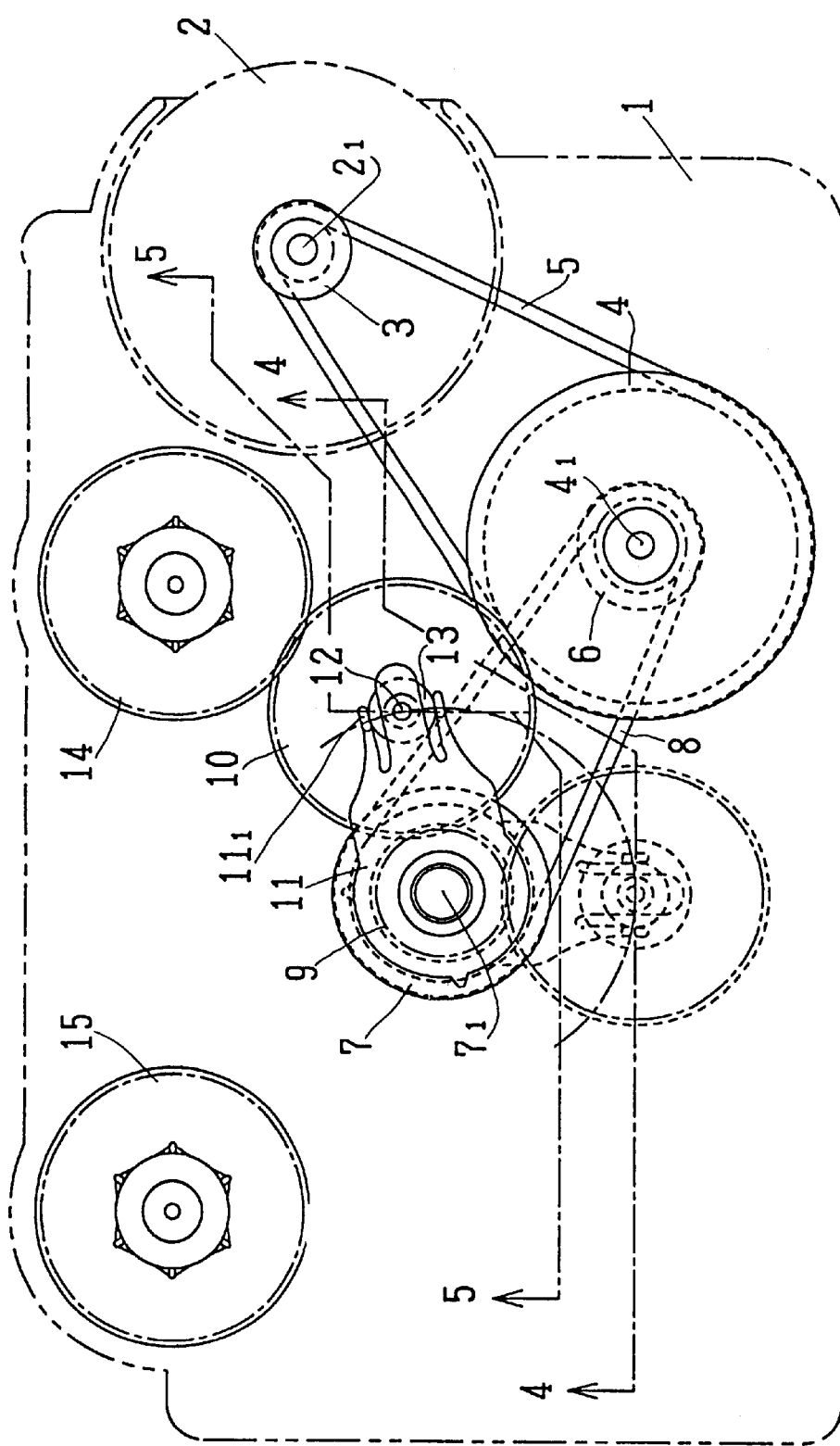
FIG. 1 is a plan view illustrating a rotational load applying mechanism for a tape recorder according to one embodiment of this invention.
Figure 2:
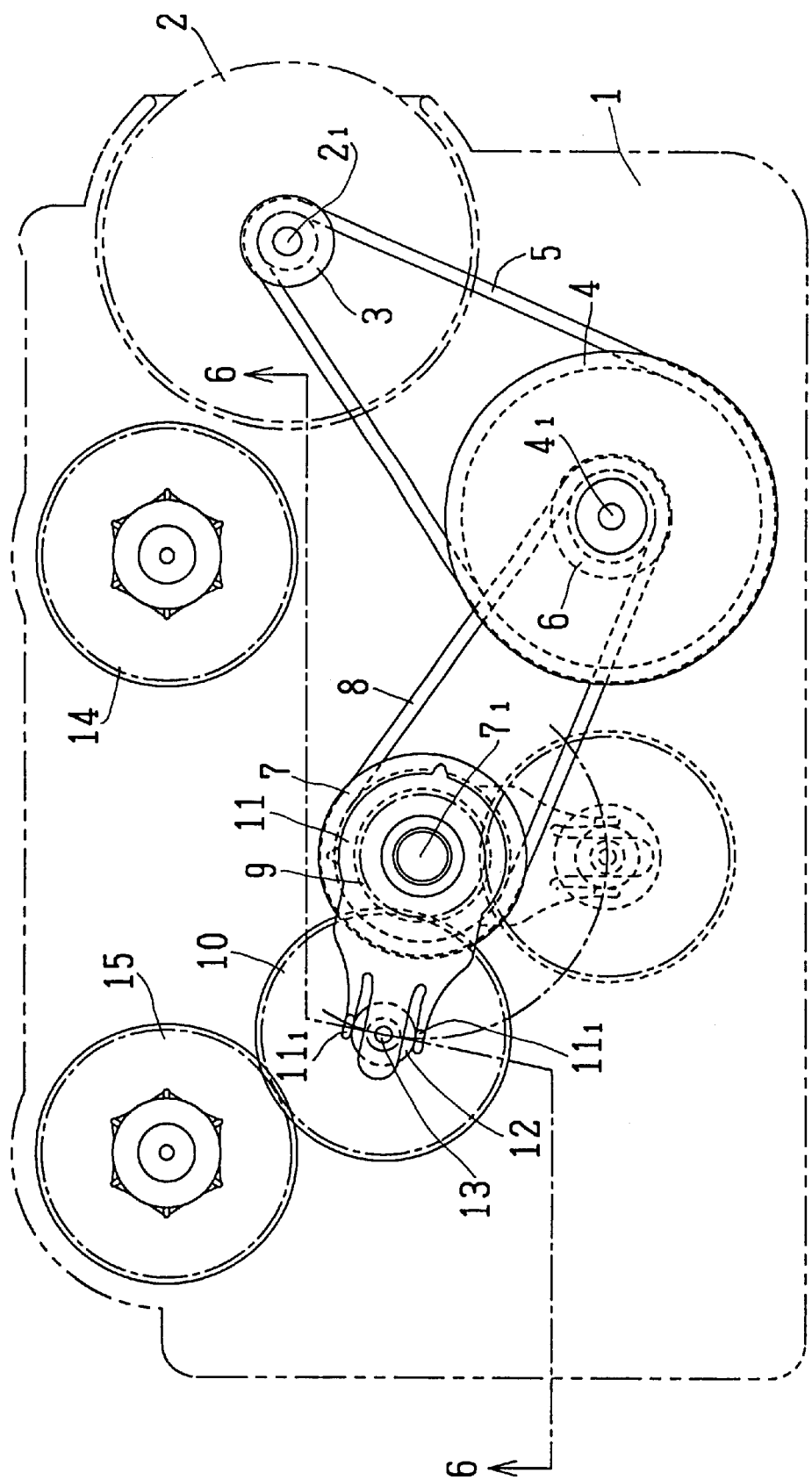
FIG. 2 is a plan view showing the operational status of the rotational load applying mechanism for a tape recorder in FIG. 1.
Figure 3:
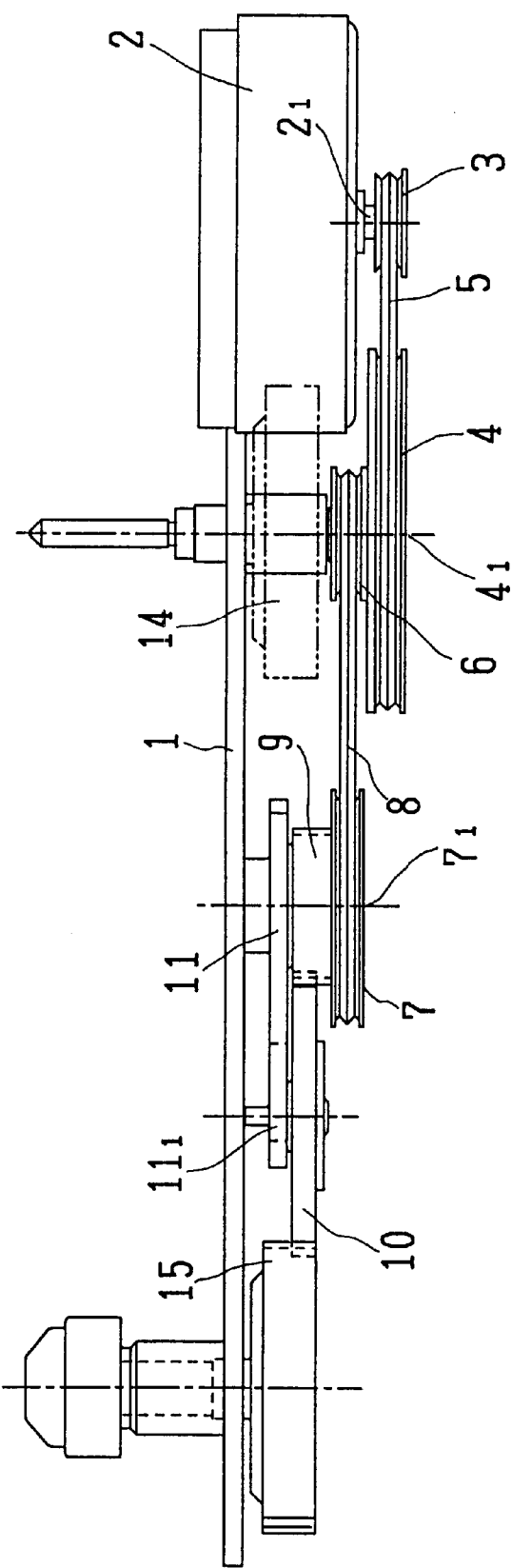
FIG. 3 is a front view of the rotational load applying mechanism in FIG. 1.
Figure 4:
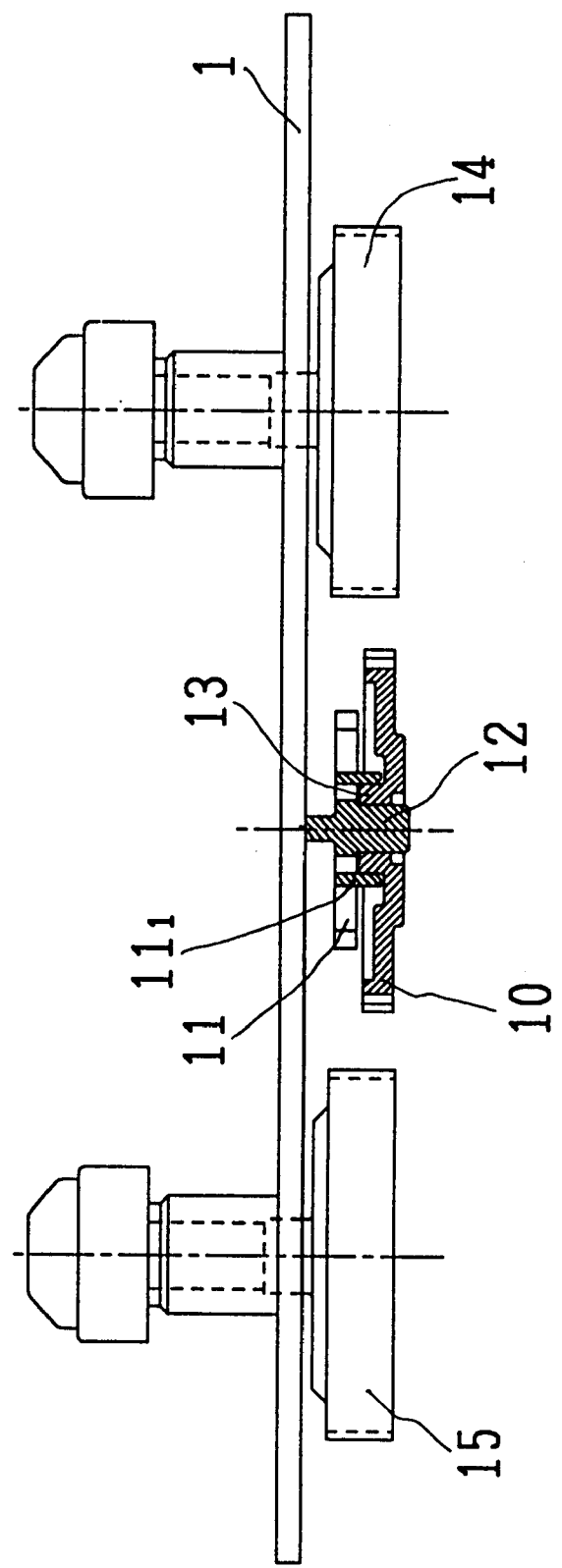
FIG. 4 is a cross-sectional view along the line 4—4 in FIG. 1.
Figure 5:
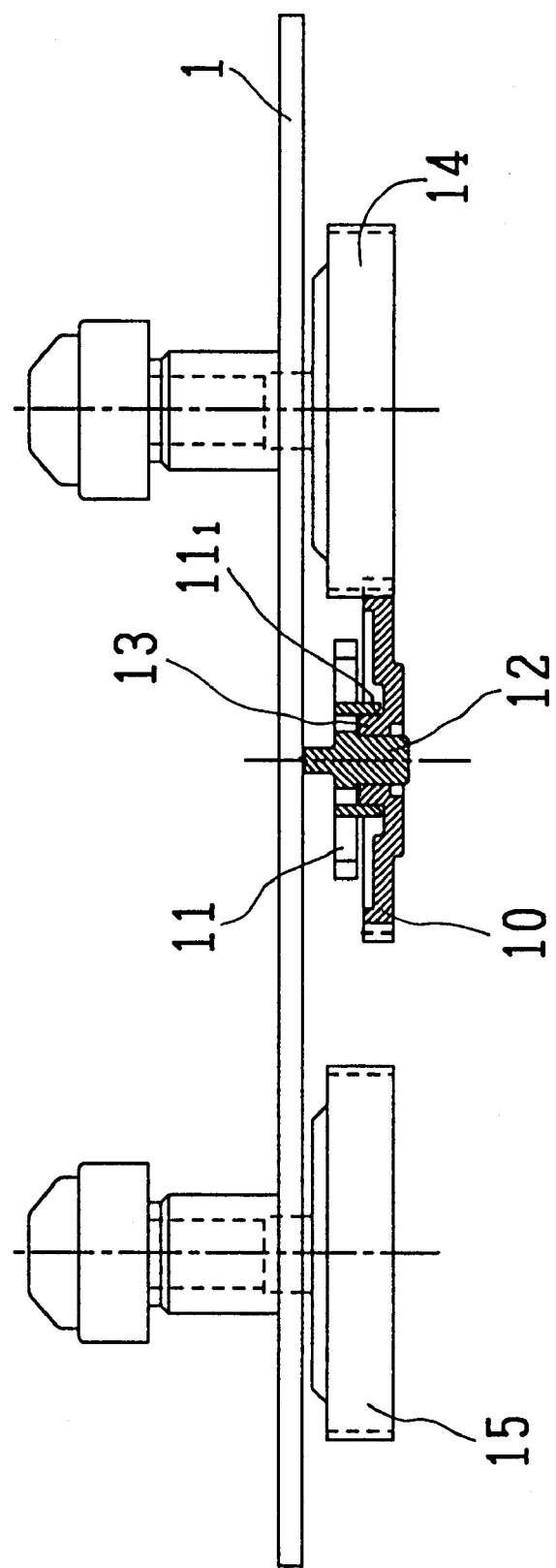
FIG. 5 is a cross-sectional view along the line 5—5 in FIG. 2.
Figure 6:
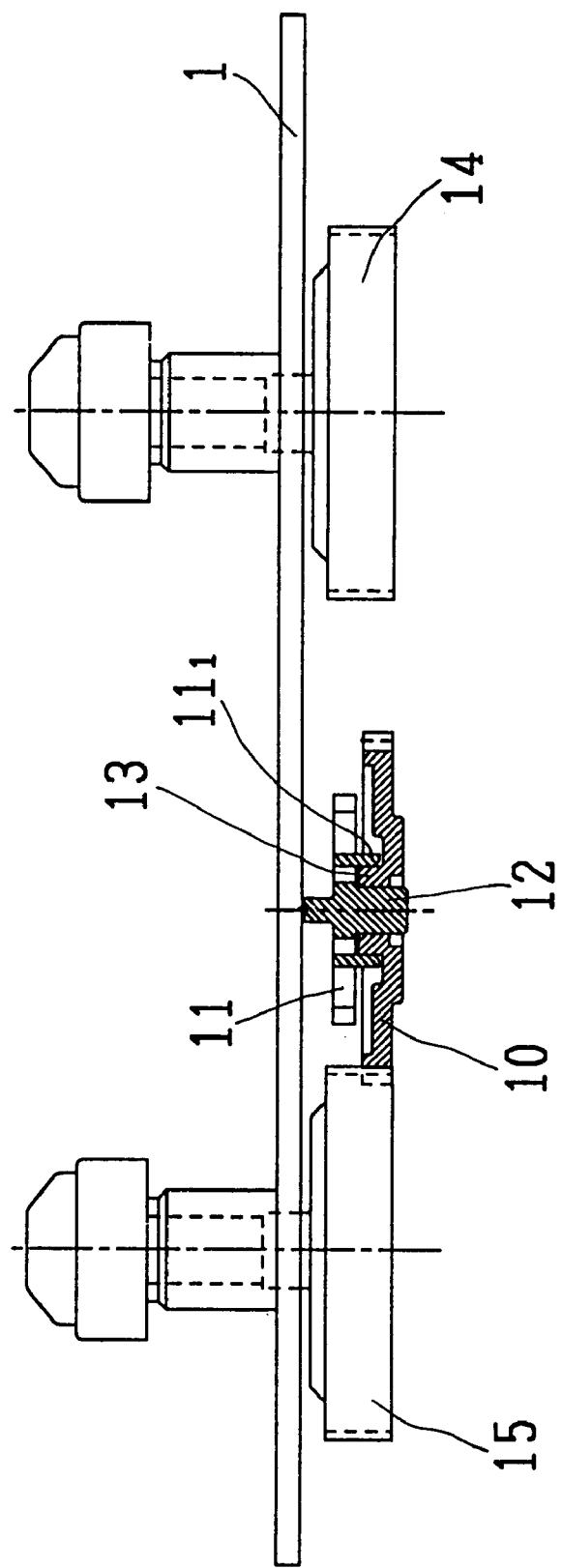
FIG. 6 is a cross-sectional view along the line 6—6 in FIG. 2.
Figure 7:
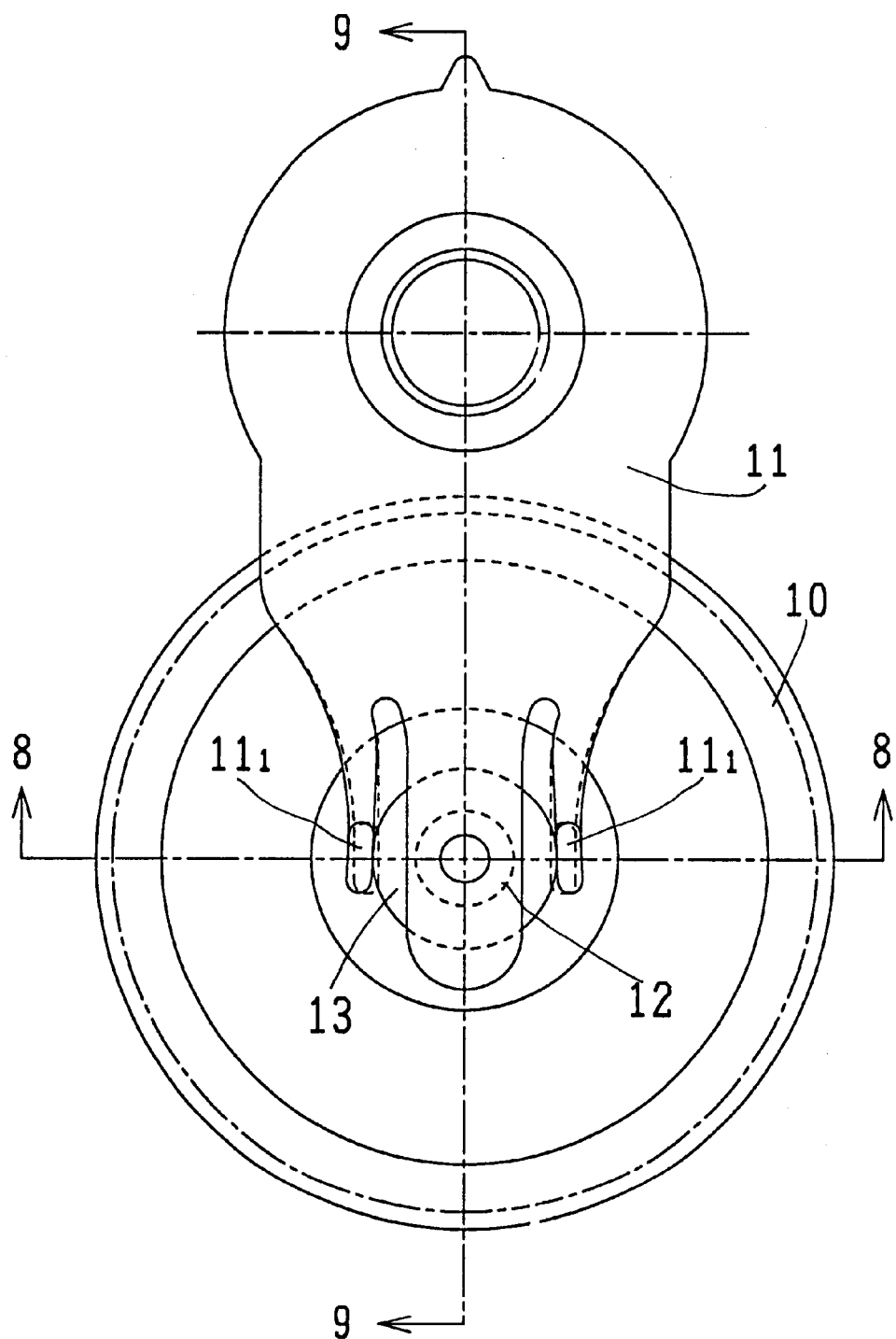
FIG. 7 is a front view of an arm member.
Figure 8:
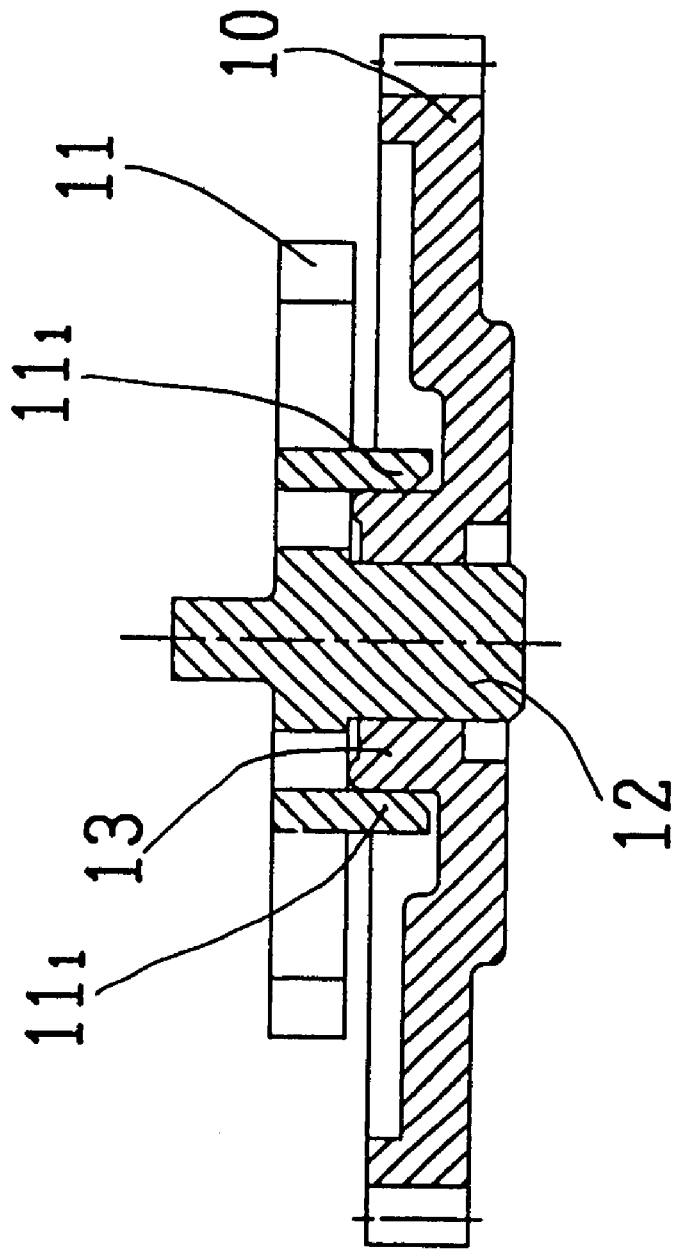
FIG. 8 is a cross-sectional view along the line 8—8 in FIG. 7.
Figure 9:
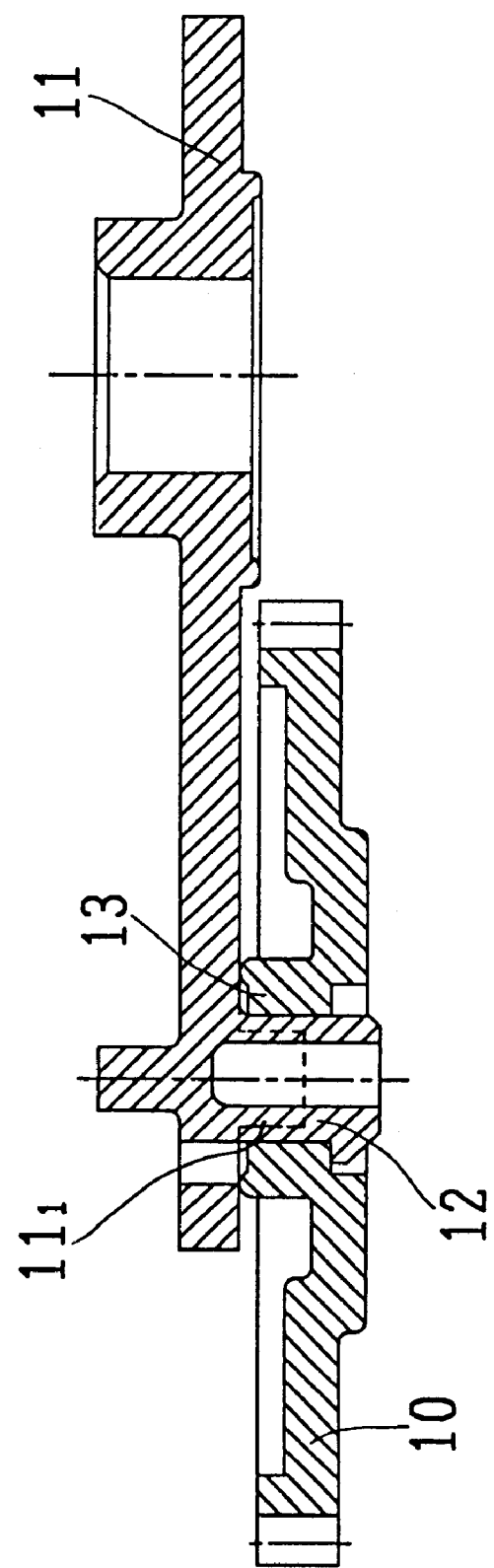
FIG. 9 is a cross-sectional view along the line 9—9 in FIG. 7.
Figure 10:
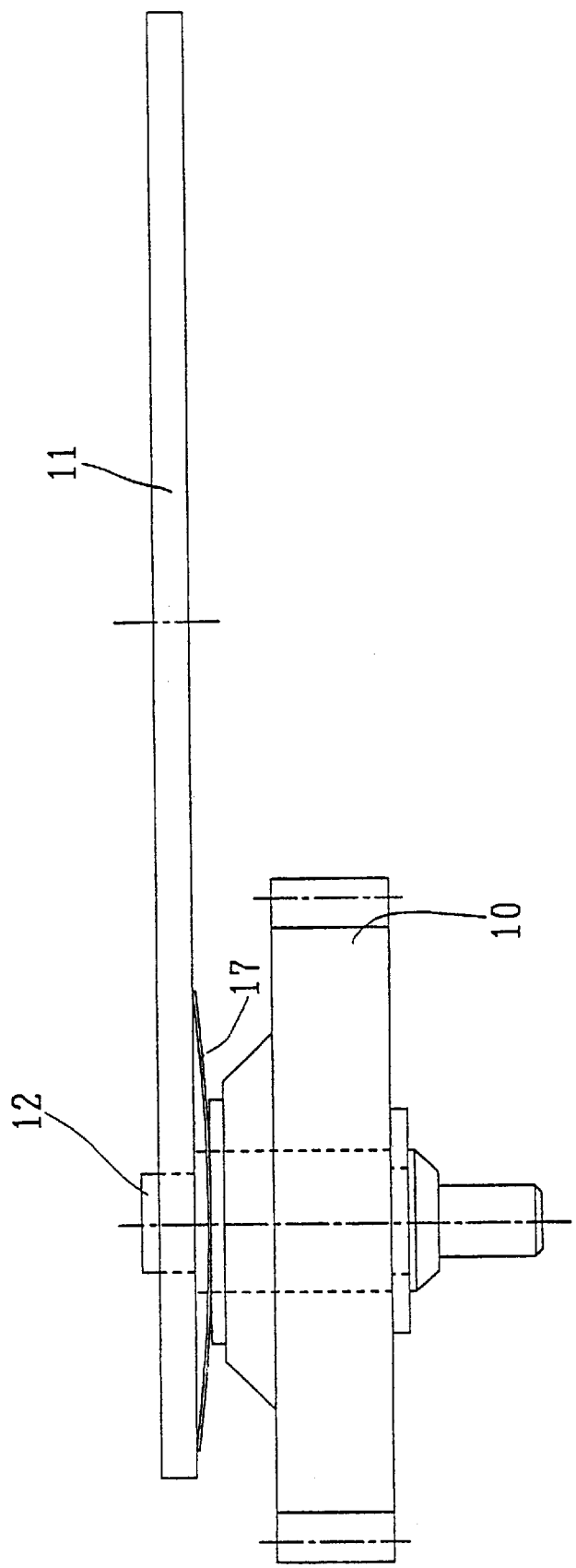
FIG. 10 is a side view showing a conventional rotational load applying mechanism.

A preferred embodiment of the present invention will now be described with reference to the accompanying drawings. Reference numeral "1" denotes a body plate, and reference numeral "2" denotes a motor. A small-diameter pulley 3 is attached to the same shaft $2_1$ of the motor 2. Reference numeral "4" is a fly-wheel. A main belt 5 is put around the small-diameter pulley 3 of the motor 2 and the fly-wheel 4. A small-diameter pulley 6 is attached to the same shaft $4_1$ of the fly-wheel 4. Reference numeral "7" is a center pulley. A sub belt 8 is put around the small-diameter pulley 6 of the fly-wheel 4 and the center pulley 7. Reference numeral "9" is a center pulley gear attached to the same shaft $7_1$ of the center pulley 7, and reference numeral "10" is a rotation transmission gear which engages with the center pulley gear 9. Reference numeral "11" denotes a plastic arm member whose base is rotatably attached to the same shaft $7_1$ of the center pulley 7. A fork-shaped elastic holder $11_1$ is formed at the distal end of the arm member 11. This fork-shaped elastic holder $11_1$ holds the outer surface of a boss 13 to be a bearing for the rotary shaft, 12, of the rotation transmission gear 10 with pressure, thereby applying a load to the rotation transmission gear 10.

Reference numeral "14" is a gear on the play-reel base side, and reference numeral "15" is a gear on the rewind-reel base side. Those gears 14 and 15 come to engagement with the rotation transmission gear 10 or disengage from the gear 10 in accordance with the rotation of the plastic arm member 9.

Specific Operational Examples

Specific operational examples of this invention will now be discussed on a case of taking up the tape and a case of rewinding the tape. The torque of the motor 2 is transmitted to the fly-wheel 4 by the main belt 5. Then, the rotation of the fly-wheel 4 is transmitted to the center pulley 7 via the sub belt 8. At the same time, the rotation transmission gear 10 in engagement with the gear 9 of the center pulley 7 rotates. At this time, the rotation transmission gear 10 is attached to the plastic arm member 11 rotatable about the center pulley shaft $7_1$, and is applied with a load by the rotary arm member 11 which holds the boss 13 of the shaft 12 of the gear 10. When the rotation of the gear 9 of the center pulley 7 acts to rotate the rotation transmission gear 10, the rotation transmission gear 10 rotates about the center pulley shaft $7_1$ together with the rotary arm member 11 and comes to engagement with the play-reel gear 14, thereby taking up the tape. As the motor 2 is rotated in the reverse direction, all the rotations mentioned are also reversed. Therefore, the rotation transmission gear 10 is rotated in the reverse direction and comes to engagement with the rewind-reel gear 15, thereby rewinding the tape.

With the above-describe structure of the rotational load applying mechanism for a tape recorder according to this invention, the shaft of a rotation transmission gear and a rotary arm member which rotates together with that shaft are formed of plastic, and an elastic fork-shaped holder is provided at the distal end of the plastic arm member, so that as the holder holds the outer surface of the rotation transmission gear, a rotational load is applied to the rotation transmission gear. As the arm member and the rotation transmission gear are both formed of plastic, it is possible to suppress wear-out caused by rubbing friction between both members as much as possible.

What is claimed is:

1. A rotational load applying mechanism for a tape recorder, the tape recorder having a rotation transmission gear configured to operably engage a reel base gear of a reel base to rotate the reel base via the reel base gear, the rotation transmission gear further having a rotary shaft configured to rotate in response to rotational force of the rotation transmission gear, the rotational load applying mechanism comprising:

a rotary arm member pivotable, together with the rotary shaft, about a common axis; and an elastic holder, formed on said rotary arm member, said elastic holder having a pair of projections that pressingly hold an outer surface of a boss between said projections, said boss configured to provide journaled rotation of said rotary shaft.

2. The mechanism according to claim 1, wherein said rotary arm member is plastic.

* * * * *